April 28, 1964        W. J. SCHRENK ETAL        3,130,959
        METHOD OF MIXING PLASTICS AND APPARATUS THEREFOR
Filed June 20, 1962                                    2 Sheets-Sheet 1

INVENTORS
WALTER J. SCHRENK,
KENNETH J. CLEEREMAN
AND TURNER ALFREY, JR.
BY Stephen J. Rudy
Jerome Rudix        ATT'YS INVENTORS
WALTER J. SCHRENK,
KENNETH J. CLEEREMAN
AND TURNER ALFREY, JR.
BY
ATT'YS

United States Patent Office 3,130,959
Patented Apr. 28, 1964

3,130,959
METHOD OF MIXING PLASTICS AND
APPARATUS THEREFOR
Walter J. Schrenk, Bay City, and Kenneth J. Cleereman and Turner Alfrey, Jr., Midland, Mich., assignors to The Dow Chemical Company, Midland, Mich., a corporation of Delaware
Filed June 20, 1962, Ser. No. 203,845
6 Claims. (Cl. 259—6)

This invention relates in general to the art of mixing or blending plastics, and more particularly to the continuous shear mixing of plastics in a viscous state with a significant improvement in mixing efficiency.

In our copending application Serial No. 98,105, filed March 24, 1961, a continuous shear mixer for the blending of viscous plastics is disclosed. The present invention represents an improvement over the invention of our copending application supra. More specifically, the present invention relates to the provision of means for twisting or reorienting layers of viscous fluids as they move within an annular channel. Use of the reorienter of the invention increases the mixing efficiency as a power function of the shear strain. The device of the present invention may be easily applied to an existing shear mixer of the type disclosed in our copending application, without the need for serious modification.

The main object of this invention is to provide a method and means for the continuous shear mixing of viscous plastics with improved mixing efficiency.

A more specific object is to provide a method and means for twisting or reorienting layers of viscous fluids as they move longitudinally within an annular channel.

Another object is to provide a reorienting means for use in a continuous shear mixer, which means may be easily installed without the need for serious modification of the basic mixer.

These and further objects and features of the invention will become more apparent from the following description and accompanying drawings wherein.

Figure 1:
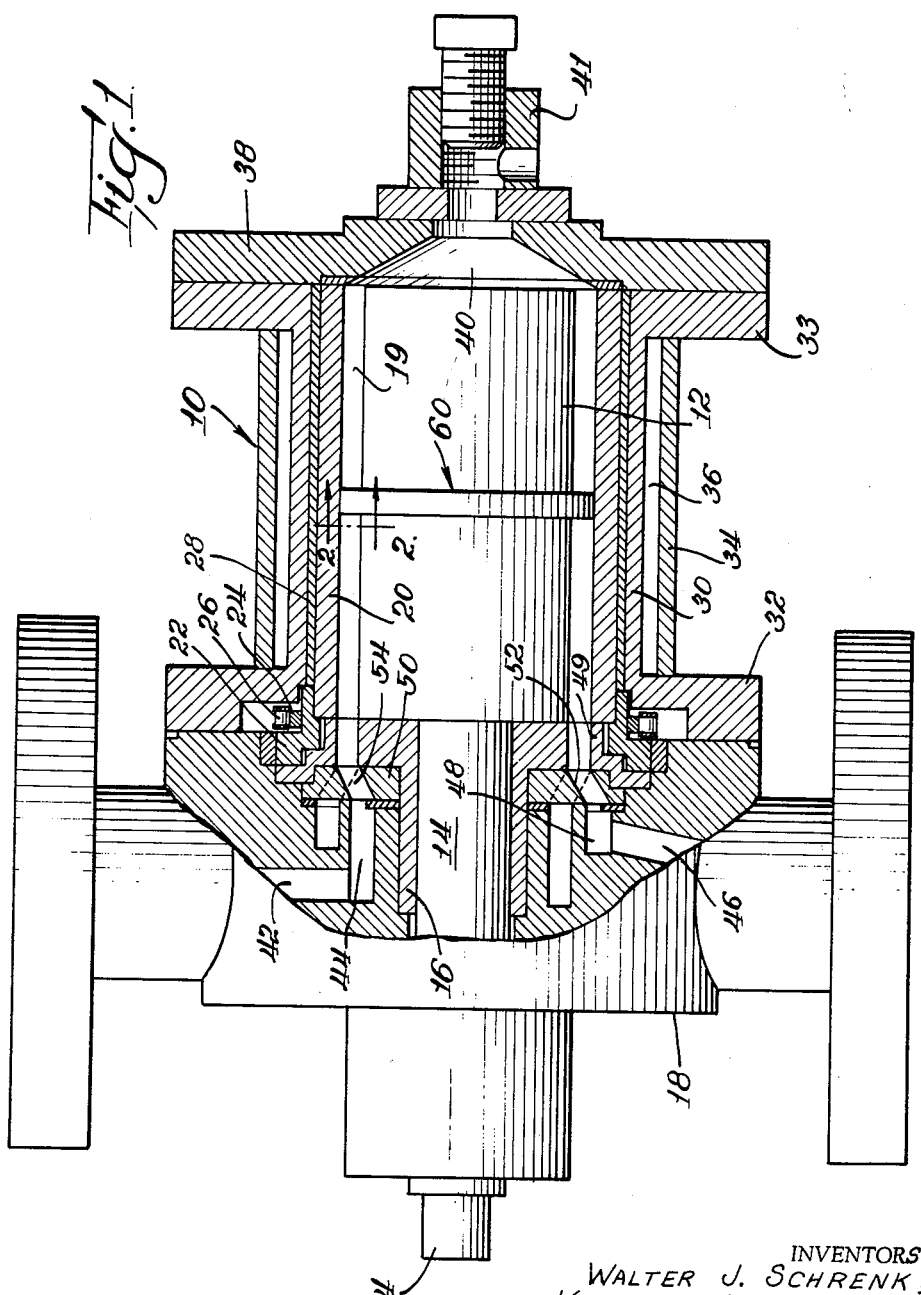
FIG. 1 is a vertical section view of a mixer in which an embodiment of the invention has been applied.

Referring now to the drawing, numeral 10 identifies a mixer including an internal rotor 12, having a smooth external diameter surface, said rotor having a shaft 14 supported in a bushing 16, which is mounted in a feed inlet housing 18. The shaft 14 projects from the housing for connection to a motor means (not shown) whereby the rotor 12 may be rotated within a speed range of 1 to 500 r.p.m. The shaft 14 and rotor 12 are provided with internal passageways (not shown) to receive medium via pipe means for heating or cooling the rotor.

Surrounding the rotor 12, and in uniform spaced relation thereto to provide a cylindrical chamber 19, is an external rotor 20, having a smooth internal surface, said rotor 20 being affixed at one end to a circular drive ring 22 having a plurality of peripherally disposed sprocket teeth 24 arranged for engagement by a drive chain 26. The chain is driven by a motor means (not shown) whereby the rotor 20 may be rotated in a direction opposite that of rotor 12, and within a speed range of 1 to 500 r.p.m. The rotor 20 is supported in a bushing 28 secured within a casing 30 having flanges 32 and 33. A barrel, or cylinder 34 surrounds the casing 30 in spaced relation with the ends abutting the flanges 32 and 33, to thus provide a cylindrical chamber 36 adapted to receive medium via pipe means (not shown) for heating or cooling the external rotor 20. An end plate 38 is secured to the flange 33 and has a recess 40 opening into a discharge valve 41 whereby flow of mixed material from the mixing chamber 19 may be regulated.

The housing 18 is formed to provide a first passageway 42 which opens into a cylindrical recess 44, and a second passageway 46 opening into a cylindrical recess 48 which extends about the recess 44 and in uniform spaced relation thereto. The axis of each cylindrical recess 44 and 48 coincides with the longitudinal axis of the internal rotor 12. An interdistributing element 50, which is disc-like in form, is positioned in the housing 18 so that one side encloses the open ends of the recesses 44 and 48. The interdistributing element 50 is formed to provide a plurality of circularly arranged, rectangular openings, or feed ports, a first set 52 being sloped, or canted, to interconnect the cylindrical recess 48 and the mixing chamber 19, while a second set 54 is sloped, or canted, to interconnect the cylindrical recess 44 and the mixing chamber 19. The feed ports 52 and 54 are arranged in alternate sequence so that material flowing therethrough will enter the mixing chamber 19 as ribbon-like layers to form an annular, multi-layer sandwich. A non-rotating ring-like element 49 is preferably arranged between the interdistributing element 50 and the external rotor 20, which provides a "dead space" allowing polymer flow to combine and adjust itself to axial velocity profile before being subjected to shear.

The apparatus described so far is identical in form and function to that disclosed in our copending application supra, and reference may be made thereto for further detail regarding the spacial relationship of the feed ports 52 and 54.

Figure 2:
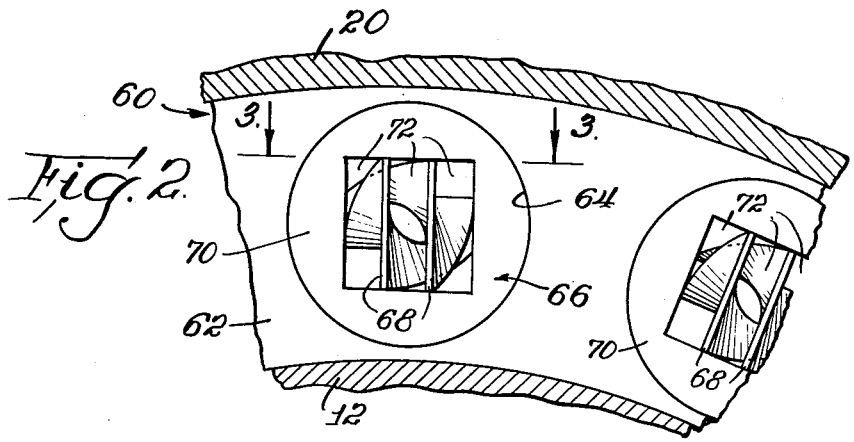
FIG. 2 is a fragmentary view generally as seen along line 2—2 in FIG. 1, and showing the arrangement of reorienter ports.
Figure 3:
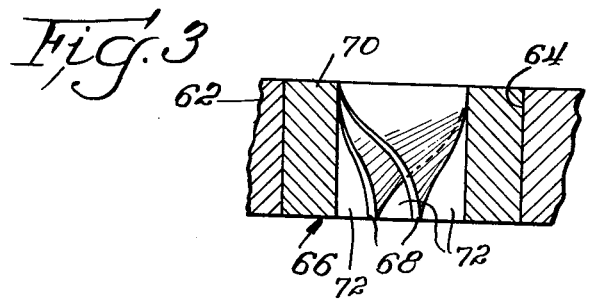
FIG. 3 is a view generally as seen along line 3—3 in FIG. 2.
Figure 7:
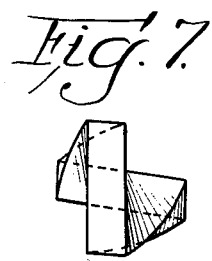
FIG. 7 is a perspective-like view showing how a quantity of plastic material would appear while passing through a reorienter duct.

A reorienter means of the invention comprises a ring assembly 60 arranged about midway in the chamber 19, which as best seen in FIGS. 2 and 3, includes a ring 62 having a plurality of equally spaced, circumferentially arranged holes 64, each of which contains a reorienting duct 66. Each duct 66 is made by silver soldering two parallel arranged steel webs or vanes 68 within a square hole sleeve 70 to form three equal rectangular sections 72, packing the sections with sand, resistance heating the duct until red, and twisting one end relative to the other end. While the degree of twist may vary, as desired, a twist of 90°, as shown in the illustrated embodiment, was found to be quite satisfactory. The major dimension of each section 72, is positioned radially on the upstream end, as seen in FIG. 2. In one ring assembly which was made to test the principle of the invention, thirty ducts 66 were equally spaced about the ring 62. The rectangular sections 72 provided a height to width ratio of approximately 3:1, although higher ratios, such as 10:1 may be used. Actually, the greater ratios provide better results because of increased drag upon the material. However, in any given case, certain factors such as pressure drop have to be taken into consideration. In other words, practical considerations have to be considered, as in the case of any design problem. The ring assembly 60 is affixed to the internal rotor 12 for rotation therewith at about midlength of chamber 19, and has an outer diameter adapted to provide a sliding fit within the external rotor 20.

Figure 5:
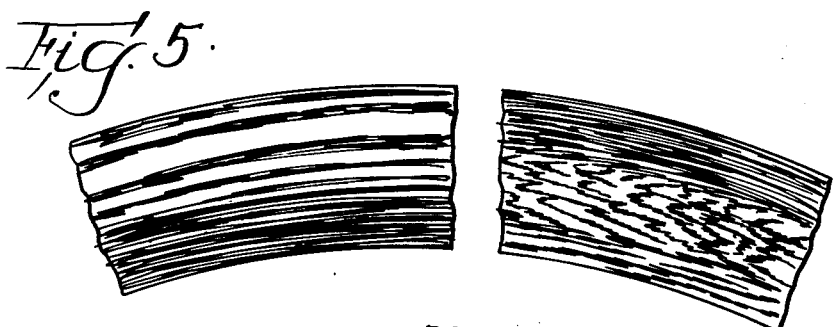
FIG. 5 is a striation pattern of a plastic material mixture just prior to entering the reorienter means of the invention.
Figure 4:
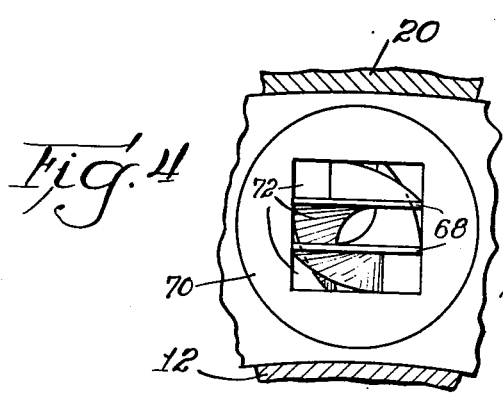
FIG. 4 is a view of a reorienter port on the opposite side of the FIG. 2 illustration.
Figure 6:
FIG. 6 is a striation pattern of a plastic material mixture after leaving the reorienter means of the invention.

The mixing ability of the reorienting unit 60 is visibly illustrated in FIGS. 5 and 6. In FIG. 5 is shown a mixture of two diverse miscible viscous plastic liquids in the region of the chamber 19 just prior to entry of the fluids into the unit 60, while in FIG. 6 is shown the same mixture after passing through the reorienting unit and approximately one inch downstream therefrom. It is apparent that the reorienting unit produces a much more thorough mixing pattern, since the relatively wide striations in the upper region of FIG. 5 are appreciably reduced in thickness after passing through the unit 60.

While the invention has been described as applied to a mixer wherein both the inner and outer rotors 12 and 20 respectively, are adapted to rotate in opposite directions, it will be apparent that the reorienting unit 60 may be applied to a mixer of said type, wherein one of the rotors is non-rotatable. It will also be apparent that the reorienting unit 60 may be affixed to the outer rotor 20 for rotation instead of to the inner rotor 12. More than one reorienting unit may also be used to provide additional twisting, which may be desirable under certain circumstances.

The foregoing description has been given in detail without though of limitation since the inventive principles involved are capable of assuming other forms without departing from the spirit of the invention or the scope of the following claims.

What is claimed is:

1. A method of mixing a plurality of diverse miscible viscous liquids comprising the steps of, arranging said liquids in a ribbon-like pattern having an alternate repetitive sequence, moving the liquids along a longitudinal path while applying a first liquid moving force along a first common boundary of the liquids, and a second liquid moving force along a second common boundary of the liquids, and reorienting the liquids by twisting them as they move longitudinally along said path.

2. A method of mixing a plurality of diverse miscible viscous liquids comprising the steps of, arranging said liquids in a radially arranged ribbon-like pattern having alternate repetitive sequence, moving the liquids longitudinally in a cylindrical volume while applying a first liquid moving force along a first common boundary of the liquids, and a second liquid moving force along a second common boundary of the liquids, and producing a reorienting action about midway along the length of the cylindrical volume whereby the liquids are rotated up to 90° as they move longitudinally.

3. In a continuous shear mixer wherein plastic material in a radially arranged ribbon-like pattern is admitted to a cylindrical volume, an improvement comprising a reorienting unit positioned in the cylindrical volume, said unit including a ring means, and a plurality of reorienting ducts in the ring means, each duct having at least one vane which is twisted up to 90° along a longitudinal direction.

4. In a continuous shear mixer wherein plastic material in a radially arranged ribbon-like pattern is admitted to a cylindrical volume, an improvement comprising a reorienting unit positioned in the cylindrical volume, said unit including a ring means, and a plurality of reorienting ducts positioned in the ring in equi-spaced relation, each of said ducts including an opening having at least one vane which is twisted up to 90° in the longitudinal direction.

5. In a continuous shear mixer wherein viscous plastic material in a radially arranged ribbon-like pattern is admitted to a cylindrical volume formed by concentrically arranged rotors, an improvement comprising a reorienting unit positioned in the cylindrical volume, said unit including a ring means, and a plurality of reorienting ducts positioned in the ring in equi-spaced relation, each of said ducts being formed to provide a square hole and a plurality of vanes arranged in parallel relation in said hole, said vanes being twisted about their longitudinal axis up to 90°.

6. In a continuous shear mixer according to claim 5, wherein said reorienting unit is positioned at approximately mid-point in the cylindrical volume.

References Cited in the file of this patent
UNITED STATES PATENTS
1,911,644   Overbury _____ May 30, 1933
FOREIGN PATENTS
566,054   Canada _____ Nov. 11, 1958